United States Patent [19]

Parker et al.

[11] Patent Number: 5,082,217
[45] Date of Patent: Jan. 21, 1992

[54] HYDRAULIC HOSE SUPPORT FOR AN IMPLEMENT

[75] Inventors: Paul D. Parker, Ankeny; Fred C. Livesay, Jr., Des Moines, both of Iowa

[73] Assignee: Deere & Company, Moline, Ill.

[21] Appl. No.: 676,055

[22] Filed: Mar. 27, 1991

[51] Int. Cl.⁵ .............................................. A62C 13/76
[52] U.S. Cl. ........................................ 248/75; 280/421
[58] Field of Search .................... 248/75, 89, 90, 74.1, 248/49, 56, 223.2, 223.4; 280/421; 137/899, 899.1; 285/61, 62; 138/89

[56] References Cited

U.S. PATENT DOCUMENTS

| | | | |
|---|---|---|---|
| 1,242,441 | 10/1917 | Hills | 248/223.2 X |
| 2,078,453 | 4/1937 | Miller | 285/62 X |
| 2,619,888 | 12/1952 | Young | 280/421 X |
| 2,626,552 | 1/1953 | Oehler | 280/421 UX |
| 3,710,096 | 1/1973 | McFarlin | 248/222.4 X |
| 4,346,863 | 8/1982 | Zeitrager | 248/56 |
| 4,395,800 | 8/1983 | Shindelaar | 138/89 X |
| 4,601,448 | 7/1986 | Miyazaki | 285/61 X |
| 5,024,409 | 6/1991 | Bohnen | 248/222.4 |

FOREIGN PATENT DOCUMENTS 1034928  8/1983  U.S.S.R. ............................... 280/421

*Primary Examiner*—J. Franklin Foss

[57] ABSTRACT

A sheet metal plate with two keyhole-shaped slots supported on a post connected to a beam on an implement hitch for supporting hydraulic hoses. An enlarged end of the slot receives the conventional hose end coupler, and the narrow portion of the slot captures the groove in the coupler. The length of the slot is selected to hold the desired number of couplers. Pairs of upright slots are provided so that hose pairs may be kept together. The hose couplers are easy to slide into and out of the storage device, which is conveniently located in an easily accessible spot on the implement hitch. The device prevents hose tip contamination and facilitates orderly storage and identification of hose pairs.

7 Claims, 1 Drawing Sheet

HYDRAULIC HOSE SUPPORT FOR AN IMPLEMENT

BACKGROUND OF THE INVENTION

1) Field of the Invention

The present invention relates generally to hydraulically operated implements and, more specifically, to supports for hydraulic hoses.

2) Related Art

Many agricultural implements have hydraulic hoses which connect a hydraulic system, which may include lift and depth control cylinders and implement folding cylinders, with the source of hydraulic fluid under pressure on the tractor. The connection to the source is typically made utilizing standard quick connect couplers (such as the type specified in ASAE Standard: ASAE S366.1). The quick connect couplers are located on the ends of the hoses and are selectively plugged into mating receptacles on the tractor. When the implement is disconnected from the tractor, the hoses with couplers must be stored on the implement. Usually the couplers are laid across the implement hitch and eventually fall down or are knocked off so that the tips pick up sand and dirt. When the dirty couplers are plugged back into the vehicle, the contaminants enter the hydraulic system of both the vehicle and the implement.

To help prevent hydraulic system contamination, a rubber block has been provided, and the couplers may be plugged into the block. However, the block is inconvenient to use since inserting or removing couplers from the block requires considerable force. The block itself often is a source of contamination. Dirt and debris collect in the block while the hydraulic system is in use. When the couplers are plugged into the block, they pick up some of the collected material which is transferred into the system when the hoses are reconnected for the next use.

BRIEF SUMMARY OF THE INVENTION

It is therefore an object of the present invention to provide an improved storage arrangement for hydraulic hoses on an implement. It is a further object to provide such an arrangement which prevents hoses from falling to the ground.

It is another object of the present invention to provide an improved storage arrangement for hydraulic hoses which is simple in construction and easy to use and which prevents coupling contamination caused by hose ends falling to the ground. It is a further object to provide such an arrangement which may be conveniently located on the implement.

It is yet another object to provide an improved storage arrangement for hydraulic hoses which easily receives and supports conventional hose couplings. It is a further object to provide such an arrangement which advantageously utilizes the grooves on standard quick couplers to secure the hose ends in such a manner that dirt contamination is substantially reduced. It is another object to provide such an arrangement which, while not supporting the couplings, will not collect dirt and debris that will be picked up by the couplers and add to system contamination.

A storage device constructed in accordance with the teachings of the present invention includes a sheet metal plate with two keyhole-shaped slots supported on a post connected to a beam on the implement hitch or frame. The large end of the slot receives the conventional hose end coupler, and the narrow portion of the slot captures the groove in the coupler. The length of the slot is selected to hold the desired number of couplers. Pairs of upright slots are provided so that hose pairs may be kept together and easily identified. The hose couplers are easy to insert and may be removed in orderly fashion from the storage device, which is conveniently located in an easily accessible spot. The device prevents hose tip contamination and is simple and inexpensive to manufacture. Dirt and debris which can be transferred to the hydraulic system after storage does not collect on the storage device while the couplers are removed therefrom.

These and other objects, features and advantages of the present invention will become apparent to one skilled in the art upon reading the following detailed description in view of the drawings.

DETAILED DESCRIPTION OF THE DRAWINGS

Figure 1:
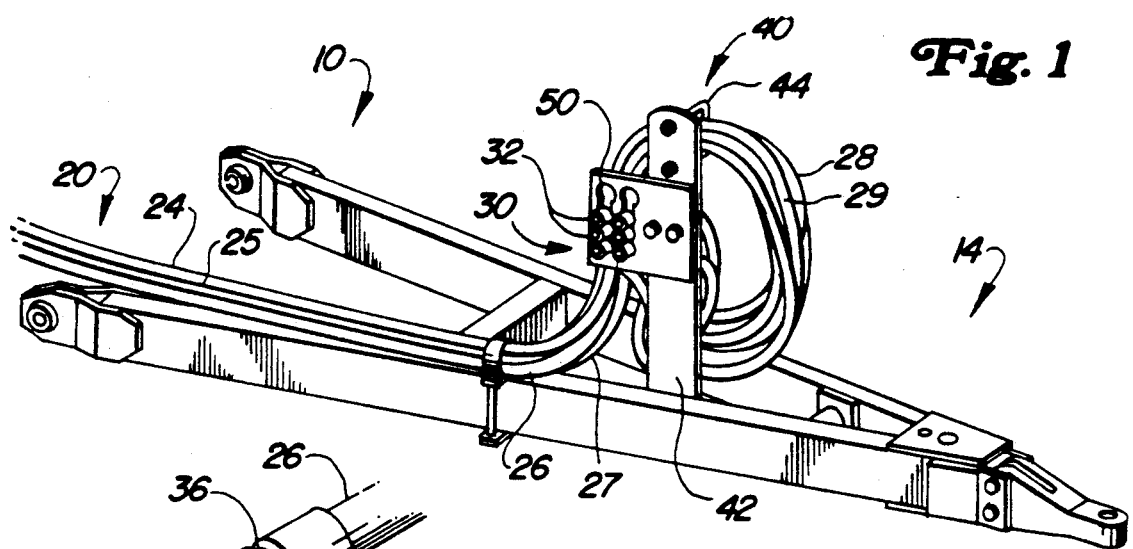
FIG. 1 is a view of a portion of an agricultural implement with the hose support of the present invention attached thereto.

Referring now to FIG. 1, therein is shown a portion of a tillage implement 10 having a main frame with a forward hitch 14 adapted for connection to a tractor. The implement 10 includes a hydraulic system indicated generally at 20 for raising and lowering the frame between field-working and transport positions, for adjusting the working depth of the implement and for folding and unfolding wing sections.

The hydraulic system 20 includes a plurality of cylinders (not shown) with pairs of hoses 24,25; 26,27 and 28,29. The hoses 24-29 have input ends 30 with identical cylindrically shaped connectors 32 attached thereto for releasibly connecting the hoses to mating ports on the tractor. Each connector 32 preferably is a standard quick connect coupler such as the aforementioned type specified in ASAE Standard ASAE S366.1 with an annular groove 36. When the hoses are disconnected from the tractor, there is a considerable amount of free length at the coupler ends of the hoses which must be routed back over the implement (FIG. 1).

A hose support indicated generally at 40 includes an upright post 42 connected at its lower end by bolts or other suitable connectors to a portion of the hitch 14. The upper end of the post 42 supports a U-bolt 44 or similar hose confining device. The hydraulic hoses 24-29 are passed through the U-bolt 44 as they are routed forwardly from the hydraulic cylinders. The U-bolt 44 loosely holds the hoses above the hitch during field operations, during transport, and while the implement is parked.

A coupler-receiving plate 50 (as well as additional implement hardware) is mounted by bolts 52 to the upper end of the post 42 below the U-bolt 44. The plate 50 includes a pair of keyhole-shaped slots 54 which are parallel and have a length which is at least several times the diameter of the connector 32. The ends of the slots 54 have a circular-shaped enlargement at 55 of diameter slightly greater than the diameter of the connector 32. The bolts 52 support the plate 50 from the post 42 so that the enlarged portions 55 of the slots 54 are uppermost, and the narrower portions of the slots extend substantially vertically.

The narrow portions of the slots 54 have a width slightly larger than the diameter of the groove 36 but less than the diameter of the connector 32 adjacent the groove. The thickness of the plate 50 is approximately equal to but slightly less than the width of the groove 36 to facilitate channeling of the groove into the slot and to assure that the plate will not bend easily and will firmly support the hoses.

Figure 2:
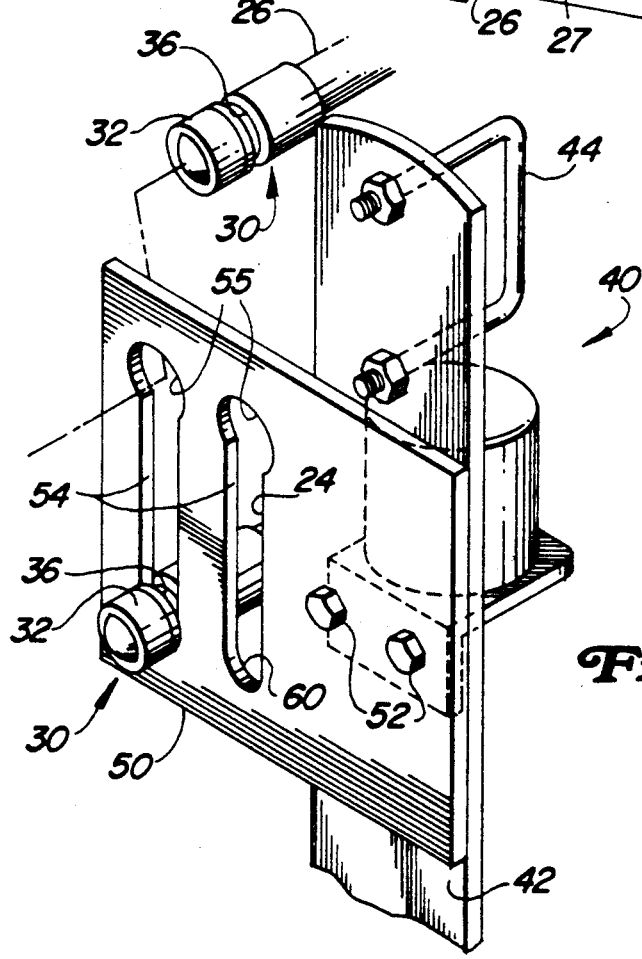
FIG. 2 is an enlarged view of the hose support.

The hoses of each hose pair can be supported conveniently in side-by-side fashion by inserting one of the couplers 32 in one slot 54 and the other coupler in the adjacent slot. The enlarged portions 55 receive the ends 32 and guide the grooves 36 into the respective slots 54. The hose ends of the first hose pair of inserted hoses slide down to the lowermost rounded bottom portions 60 of the slots 54. Thereafter, additional hose pair ends simply stack on top of the first hose pair ends (FIG. 1). Each hose pair is supported in side-by-side fashion to more easily identify hoses and maintain proper hose routing. To remove a hose pair, the connectors 32 of that pair are raised to the enlarged portions 55 and then moved rearwardly (as viewed in FIG. 2) out from the plate 50.

Having described the preferred embodiment, it will become apparent that various modifications can be made without departing from the scope of the invention as defined in the accompanying claims.

We claim:

1. In an implement having a frame adapted for towing by a vehicle in an area with substantial amounts of dirt and other contaminants, the implement having a hydraulic system with hoses and hose couplers located on the hose ends and adapted for connection to and disconnection from a source of hydraulic fluid on the towing vehicle, the hose couplers being generally cylindrical in configuration with an annular groove, hose support structure comprising:

a coupler support having a slot therein of width approximately equal to the outer diameter of the coupler groove, the slot having an input area at one end thereof for receiving at least one of the couplers and facilitating receipt of the annular groove by the slot when the coupler is disconnected from the source, wherein the coupler when received in the slot projects into an area located outwardly from the support;

means for connecting the coupler support to the implement with the slot extending downwardly from the input-area for slidably receiving and supporting the hose ends above the implement frame; and wherein the outwardly located area into which the coupler projects is substantially open and non-confining to the contaminants so that build-up of the contaminants in said area is eliminated.

2. The invention as set forth in claim 1 wherein the coupler support comprises a flat plate, and wherein the endmost portion of the coupler when the coupler is received in the slot projects outwardly away from the plate into the open atmosphere.

3. The invention as set forth in claim 1 wherein the coupler support comprises means for supporting a pair of hose couplers in side-by-side relationship, said means for supporting including a second slot extending parallel to the first-mentioned slot.

4. The invention as set forth in claim 1 wherein the slot is substantially keyhole shaped with an enlarged end defining the input area.

5. The invention as set forth in claim 4 wherein the enlarged end is generally circular in configuration and has a diameter slightly larger than the diameter of the hose coupler.

6. The invention as set forth in claim 3 wherein the means for connecting the coupler support to the implement includes an upright member connected with a lower end connected to the implement and an upper plate receiving portion, and further including a hose support bracket connected to the upright member.

7. The invention as set forth in claim 2 wherein the groove has a preselected width, and the plate has a thickness approximately equal to the preselected width.

* * * * *